United States Patent
Niemela

(10) Patent No.: US 10,298,424 B2
(45) Date of Patent: May 21, 2019

(54) COVERAGE OPTIMIZATION WITH FRACTIONAL BANDWIDTH

(71) Applicant: Nokia Solutions and Networks Oy, Espoo (FI)

(72) Inventor: Kari Juhani Niemela, Oulu (FI)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 15/327,809

(22) PCT Filed: Jul. 21, 2014

(86) PCT No.: PCT/EP2014/065648
§ 371 (c)(1),
(2) Date: Jan. 20, 2017

(87) PCT Pub. No.: WO2016/012033
PCT Pub. Date: Jan. 28, 2016

(65) Prior Publication Data
US 2017/0207938 A1      Jul. 20, 2017

(51) Int. Cl.
| H04L 27/00 | (2006.01) |
| H04L 27/26 | (2006.01) |
| H04L 25/03 | (2006.01) |
| H04L 27/20 | (2006.01) |

(52) U.S. Cl.
CPC .... H04L 27/0008 (2013.01); H04L 25/03834 (2013.01); H04L 27/2017 (2013.01); H04L 27/2697 (2013.01); H04L 25/03343 (2013.01)

(58) Field of Classification Search
CPC ........... H04L 27/0008; H04L 25/03834; H04L 27/2017; H04L 27/2697; H04L 25/03343
See application file for complete search history.

(56) References Cited

U.S. PATENT DOCUMENTS

| 9,820,154 B2 * | 11/2017 | Das .................. H04W 16/02 |
| 2013/0114433 A1 * | 5/2013 | Park .................. H04W 16/02 370/252 |
| 2014/0169325 A1 | 6/2014 | Ratasuk |

FOREIGN PATENT DOCUMENTS

| WO | 2011/093778 A1 | 8/2011 |
| WO | 2014/031059 A1 | 2/2014 |

OTHER PUBLICATIONS

"GSM optimization for Internet of Things", 3GPP TSGE-RAN meeting #62, GP-140297, Agenda: 6.1, Ericsson, May 26-30, 2014, pp. 1-16.

(Continued)

*Primary Examiner* — David S Huang
(74) *Attorney, Agent, or Firm* — Squire Patton Boggs (US) LLP

(57) ABSTRACT

It is provided a method, comprising modulating a carrier signal based on a group of input bits comprising n input bits with n=1, 2, 3, . . . out of $2^n$ possible groups of input bits, such that, for each of the $2^n$ possible groups of input bits, a respective sequence of N symbols is generated, wherein N is predefined, each symbol has a same duration T, a bandwidth of the respective sequence of the N symbols is $k/(N*T)$ with k being a real value and $0<k<N$.

18 Claims, 7 Drawing Sheets

| Examples of properties provided by narrow band symbol sequences | | | | |
|---|---|---|---|---|
| System | GSM | | | LTE |
| Modulation method of symbols | GMSK | 8PSK with 3π/7 rotation | 8PSK with π/2 rotation | QPSK |
| Length of symbol sequence (T = duration of symbol) | 8T ≅ 29.5 μs | | | 4T ≅ 267 μs |
| Bandwidth of symbol sequence (T = duration of symbol) | 1/(8T) ≅ 34 kHz | | | 1/(4T) ≅ 3.75kHz |
| Number of possible frequency offsets | 2 | 4 | 5 | 3 |
| Number of possible data bits with FSK | 1 | 2 | 2 | 1 |
| Number of possible data bits with MSK / BPSK | 1 | 1 | 1 | 1 |
| Number of possible data bits with both FSK and MSK/BPSK | 2 | 3 | 3 | 2 |

(56) References Cited

OTHER PUBLICATIONS

"New Study Item on Cellular System Support for Ultra Low Complexity and Low Throughput Internet of Things", 3GPP TSGE-RAN meeting #62, GP-140421, Agenda: 11.1, Vodafone Group Plc., May 26-30, 2014, 6 pages.

"Proposed Workplan for Cellular IoT (FS_IoT_LC) study before GERAN#63", 3GPP TSGE-RAN meeting #62, GP-140428, Vodafone Group Plc., May 26-30, 2014, pp. 1-6.

"LS on Study Item for Low Throughput Internet of Things", 3GPP TSGE-RAN meeting #62, GP-140429, TSG GERAN, May 26-30, 2014, 1 page.

"Preceding", Wikipedia, Retrieved on Mar. 7, 2018, Webpage available at : https://en.wikipedia.org/wiki/Precoding.

"Coded Modulation", Institutt for Informatikk (University of Bergen), Retrieved on Mar. 7, 2018, Webpage available at : http://www.ii.uib.no/~eirik/INF244/Lectures/Lecture20.pdf.

"Block Coded Modulation and Related Topics", Rywei.ce.ncu, Retrieved on Mar. 7, 2018, Webpage available at : http://rywei.ce.ncu.edu.tw/course/96/ACT/Lecture7.pdf.

Jin, "Discrete Cosine Transform for Pre-coded EGPRS", Master's Degree Project, 2012, 80 pages.

Bartoli et al., "Low-Power Low-Rate Goes Long-Range: The Case for Secure & Cooperative Machine-to-Machine Communications", International Conference on Research in Networking, vol. 6827, May 13, 2011, 12 pages.

"Discussion on MTC Evolution for Cellular IoT", 3GPP TSGE-RAN meeting #62, GP-140322, Agenda: 6.1, Huawei Technologies Co. Ltd., May 26-30, 2014, pp. 1-6.

"Evaluations on Narrow-band M2M", 3GPP TSG GERAN meeting #62, GP-140323, Agenda: 6.1, Huawei Technologies Co. Ltd., May 26-30, 2014, pp. 1-10.

"Smart Meter Communications and Coverage", Parliament.uk, Retrieved on Mar. 7, 2018, Webpage available at : https://publications.parliament.uk/pa/cm201314/cmselect/cmenergy/161/16107.htm.

Office action received for corresponding European Patent Application No. 14742498.0, dated Feb. 28, 2018, 6 pages.

International Search Report and Written Opinion received for corresponding Patent Cooperation Treaty Application No. PCT/EP2014/065648, dated Mar. 20, 2015, 10 pages.

Petar Popovski et al. "Deliverable D2.3 Components of a New Air Interface—Building Blocks and Performance Project Name: Mobile and Wireless Communications Enablers for Twenty-twenty Information Society Author(s)".

Sklar B., "Defining, Designing and Evaluating Digital Communication Systems", IEEE Communications Magazine, IEEE Service Center, Piscataway, US, vol. 31, No. 11, Nov. 1, 1993.

3rd Generation Partnership Project; Technical Specification Group GSM/EDGE Radio Access Network; Modulation (Release 11), 3GPP TS 45.004, 3rd Generation Partnership Project (3GPP), vol. Geran WG1, No. V11.0.0, Sep. 18, 2012, XP050649450.

Feb. 7, 2019 Office Action issued in European Patent Application No. 14742498.0.

* cited by examiner

Examples of properties provided by narrow band symbol sequences

| System | GSM | | | LTE |
|---|---|---|---|---|
| Modulation method of symbols | GMSK | 8PSK with 3π/7 rotation | 8PSK with π/2 rotation | QPSK |
| Length of symbol sequence (T = duration of symbol) | | 8T ≅ 29.5 μs | | 4T ≅ 267 μs |
| Bandwidth of symbol sequence (T = duration of symbol) | | 1/(8T) ≅ 34 kHz | | 1/(4T) ≅ 3.75kHz |
| Number of possible frequency offsets | 2 | 4 | 5 | 3 |
| Number of possible data bits with FSK | 1 | 2 | 2 | 1 |
| Number of possible data bits with MSK / BPSK | 1 | 1 | 1 | 1 |
| Number of possible data bits with both FSK and MSK/BPSK | 2 | 3 | 3 | 2 |

Example of pre-coding for GMSK with both FSK and MSK in use

| Input bits $b_{2i}, b_{2i+1}$ | Set of ordered Codewords (bits) $d_k, d_{k+1}, ..., d_{k+7}$ | Properties of GMSK symbol sequence s(k) | | |
|---|---|---|---|---|
| | | Complex values | Shifted FFT | Phase | Frequency offset |
| 1,1 | 0,0,0,0,0,0,0,0 | 1,j,-1,-j,1,j,-1,-j | 0,0,0,0,0,8,0 | 1 | $1/(4T) \cong + 68$ kHz |
| 0,1 | 1,1,1,1,1,1,1,1 | -1,-j,1,j,-1,-j,1,j | 0,0,0,0,0,0,-8,0 | -1 | $1/(4T) \cong + 68$ kHz |
| 0,0 | 0,1,0,1,0,1,0,1 | -1,j,-1,j,-1,j,-1,j | 0,0,-8,0,0,0,0,0 | -1 | $-1/(4T) \cong - 68$ kHz |
| 1,0 | 1,0,1,0,1,0,1,0 | 1,-j,-1,j,1,-j,-1,j | 0,0,8,0,0,0,0,0 | 1 | $-1/(4T) \cong - 68$ kHz |

Fig. 3b)

Example of pre-coding for GMSK with MSK in use

| Input bit $b_i$ | Set of ordered Codewords (bits) $d_k, d_{k+1}, ..., d_{k+7}$ | Properties of GMSK symbol sequence s(k) | | |
|---|---|---|---|---|
| | | Complex values | Shifted FFT | Phase | Frequency offset |
| 1 | 0,0,0,0,0,0,0,0 | 1,j,-1,-j,1,j,-1,-j | 0,0,0,0,0,0,8,0 | 1 | $1/(4T) \cong + 68$ kHz |
| 0 | 1,1,1,1,1,1,1,1 | -1,-j,1,j,-1,-j,1,j | 0,0,0,0,0,0,-8,0 | -1 | $1/(4T) \cong + 68$ kHz |

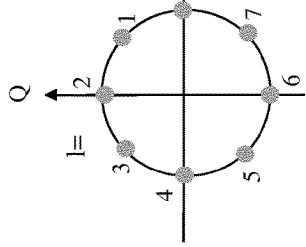

| Codewords $d_{3i}, d_{3i+1}, d_{3i+2}$ | Phase index $I$ |
|---|---|
| 1,1,1 | 0 |
| 0,1,1 | 1 |
| 0,1,0 | 2 |
| 0,0,0 | 3 |
| 0,0,1 | 4 |
| 1,0,1 | 5 |
| 1,0,0 | 6 |
| 1,1,0 | 7 |

Fig. 4b)

Example of pre-coding for 8PSK with both 4FSK and BPSK in use

| Input bits $b_{3i}, b_{3i+1}, b_{3i+2}$ | Set of ordered Codewords (phase indices) $I_k, I_{k+1}, \ldots, I_{k+7}$ | Properties of 8PSK symbol sequence s(k) with symbol rotation of π/2 | | |
|---|---|---|---|---|
| | | Phase values | Shifted FFT | Phase | Frequency offset |
| 0,1,1 | 4,4,4,4,4,4,4,4 | π,3π/2,0,π/2,π,3π/2,0,π/2 | 0,0,0,0,0,0,-8,0 | -1 | 1/(4T) ≅ + 68 kHz |
| 0,0,1 | 4,3,2,1,0,7,6,5 | π,5π/4,3π/2,7π/4,0,π/4,π/2,3π/4 | 0,0,0,0,0,0,-8,0,0 | -1 | 1/(8T) ≅ + 34 kHz |
| 0,0,0 | 4,1,6,3,0,5,2,7 | π,3π/4,π/2,π/4,0,7π/4,3π/2,5π/4 | 0,0,-8,0,0,0,0,0 | -1 | -1/(8T) ≅ - 34 kHz |
| 0,1,0 | 4,0,4,0,4,0,4,0 | π,π/2,0,3π/2,π,π/2,0,3π/2 | 0,0,-8,0,0,0,0,0 | -1 | -1/(4T) ≅ - 68 kHz |
| 1,1,1 | 0,0,0,0,0,0,0,0 | 0,π/2,π,3π/2,0,π/2,π,3π/2 | 0,0,0,0,0,8,0 | 1 | 1/(4T) ≅ + 68 kHz |
| 1,0,1 | 0,7,6,5,4,3,2,1 | 0,π/4,π,π/2,3π/4,π,5π/4,3π/2,7π/4 | 0,0,0,0,8,0,0 | 1 | 1/(8T) ≅ + 34 kHz |
| 1,0,0 | 0,5,2,7,4,1,6,3 | 0,7π/4,3π/2,5π/4,π,3π/4,π/2,π/4 | 0,0,8,0,0,0,0,0 | 1 | -1/(8T) ≅ - 34 kHz |
| 1,1,0 | 0,4,0,4,0,4,0,4 | 0,3π/2,π,π/2,0,3π/2,π,π/2 | 0,8,0,0,0,0,0 | 1 | -1/(4T) ≅ - 68 kHz |

Fig. 4c)

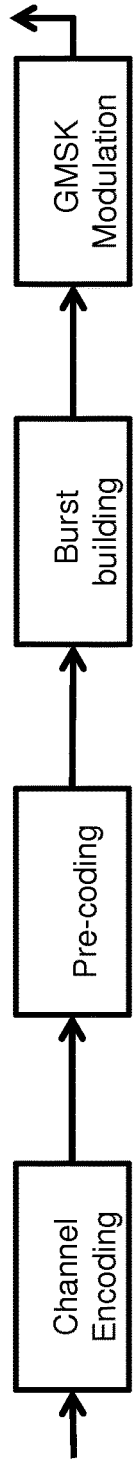
Fig. 6a)
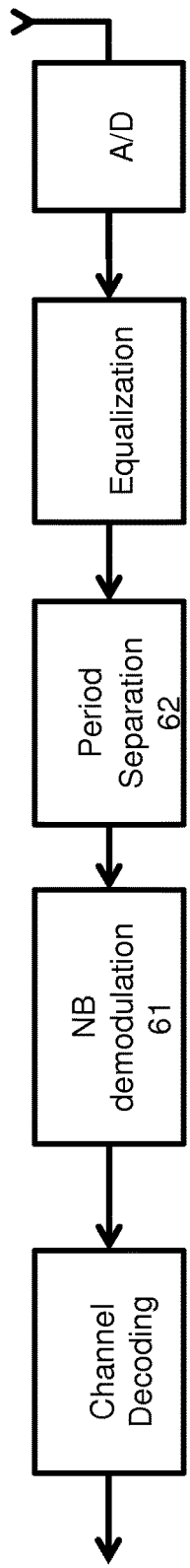
Fig. 6b)
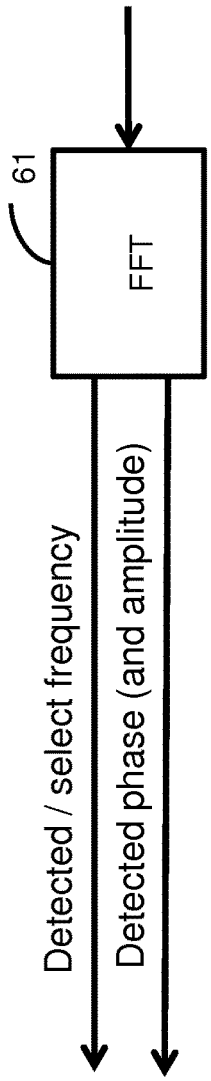
Fig. 6c) NB Demodulation option with FFT

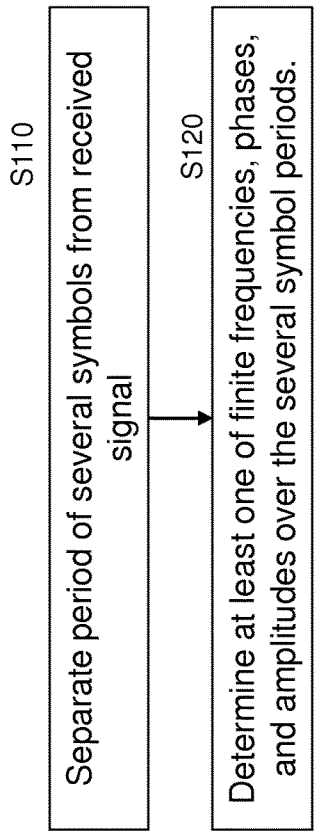
Fig. 8
S10
Modulate carrier frequency based on input bit(s) such that sequence of symbols with narrow bandwidth is generated
Fig. 10
S110
Separate period of several symbols from received signal
S120
Determine at least one of finite frequencies, phases, and amplitudes over the several symbol periods.
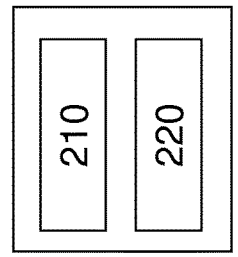
Fig. 7
10
Fig. 9
110
120
Fig. 11
210
220

COVERAGE OPTIMIZATION WITH FRACTIONAL BANDWIDTH

RELATED APPLICATION

This application was originally filed as Patent Cooperation Treaty Application No. PCT/EP2014/065648 filed Jul. 21, 2014.

FIELD OF THE INVENTION

The present invention relates to an apparatus, a method, and a computer program product related to mobile communication. More particularly, the present invention relates to an apparatus, a method, and a computer program product related to coverage optimization for low bit rate communication.

BACKGROUND OF THE INVENTION

Abbreviations

3GPP 3rd generation Partnership Project
A/D Analogue to Digital Conversion
BER Bit Error Ratio
BLER Block Error Ratio
bps bits per second
BPSK Binary Phase Shift Keying
BS Base Station
BSS Base Station System
BW bandwidth
dB Decibel
DFT Discretel Fourier Transform
DL Downlink
DSP Digital Signal Processor
EDGE Enhanced Data rates for GSM Evolution
FFT Fast Fourier Transform
FSK Frequency Shift Keying
GERAN GSM EDGE RAN
GMSK Gaussian Minimum Shift Keying
GPRS Global Packet Radio Service
GSM Global System for Mobile Communication
HM Hybrid Modulation
HSPA High Speed Packet Access
HW Hardware
ICI Inter (Sub)Carrier Interference
IoT Internet of Things
ISI Inter Symbol Interference
kbps kilobits per second
LTE Long Term Evolution
LTE-A LTE Advanced
M2M Machine-to-Machine (communication)
MAC Medium Access Control
MSK Minimum Shift Keying
MTC Machine Type Communication
N.A. Not applicable
NB-MSK Narrow Band-MSK
OFDM Orthogonal Frequency Division Multiplex
PSK Phase Shift Keying
RAN Radio Access Network
RF Radio Frequency
RLC Radio Link Control
SF Stealing Flag
TS Technical Specification
TSC Training Sequence
TTI Transmission Time Interval
UTRAN Universal Terrestrial Radio Access Network
WCDMA Wideband Code Division Multiple Access
WiFi Wireless Fidelity

REFERENCES

[1] 3GPP GP-140421;
[2] 3GPP TS 45.004

Machine type communication (MTC), including Machine to Machine communication (M2M), is shown to be a rapidly growing market segment for cellular technologies with further requirements on extended coverage, long battery life, low device complexity and a large number of connected devices. New study items in standardization have been initiated on focusing these requirements. E.g., 3GPP GERAN approved *Study item Cellular System Support for Ultra Low Complexity and Low Throughput Internet of Things* at GERAN#62 (26-30 May 2014). [1]

Among these requirements, extended coverage may be seen as a most important item, e.g. due to regulations on radio coverage or due to meters located in basement with high penetration loss of radio signal. An objective to improve up to 20 dB was set in [1]. A viable improvement should not have a HW impact to existing GSM/EDGE network hardware and should be able to multiplex legacy devices with new coverage optimised devices (backward-compatibility).

The following methods to obtain an extended coverage are known, all of which have some rather severe drawbacks:

Repetition (i.e. repeated transmission of the same bursts) may improve coverage, but it may consume battery because at least hundred repetitions may be needed for 20 dB gain.

Further channel coding (i.e. a more complex channel coding) would increase complexity of devices. The gain is not linearly proportional to complexity or level/grade of coding.

Reduced BW of the transmitter would introduce incompatibility with current modulators fed by modulating bits. E.g. new symbols may need to be created as complex samples instead. However, reducing BW has about linear impact to coverage opposite to increasing the number of repetitions or increasing complexity of coding, thus it seems to be the most attractive approach to meet given objectives, if backward-compatibility can be ensured.

SUMMARY OF THE INVENTION

It is an object of the present invention to improve the prior art.

According to a first aspect of the invention, there is provided an apparatus, comprising narrowband modulating means adapted to modulate a carrier signal based on a group of input bits comprising n input bits with n=1, 2, 3, . . . out of $2^n$ possible groups of input bits, such that, for each of the $2^n$ possible groups of input bits, a respective sequence of N symbols is generated, wherein N is predefined, each symbol has a same duration T, a bandwidth of the respective sequence of the N symbols is k/(N*T) with k being a real value and 0<k<N. k may be equal to 1.

There may be a broadband sequence of N symbols of the duration T on the carrier signal, wherein the bandwidth of the broadband sequence is 1/T.

The narrowband modulating means may comprise selecting means adapted to select, based on the group of input bits, a set of ordered codewords out of a predefined group of sets of ordered codewords; and generic modulating means adapted to modulate the carrier signal with the set of ordered codewords as a payload in order to obtain the respective sequence of N symbols, wherein each of the codewords represents a predefined number b of bits with b=1, 2, 3, . . . ; each of the sets of ordered codewords comprises a predefined number of C codewords such that C*b=N>n; for each of the sets of ordered codewords of the group of sets of ordered codewords, a bandwidth of the respective sequence of symbols is k/(N*T).

The apparatus may further comprise inhibiting means adapted to inhibit the generic modulating means from modulating the carrier signal with a broadband set of ordered codewords as the payload, wherein the broadband set of ordered codewords does not belong to the predefined group of sets of ordered codewords.

The generic modulating means may be adapted to modulate with a constant envelope. The generic modulating means may be adapted to modulate by Gaussian minimum shift keying. The generic modulating means may be adapted to modulate by 8-phase shift keying. The generic modulating means may be adapted to modulate according to a specification of the global system for mobile communication. The generic modulating means may be adapted to modulate according to OFDM system.

The apparatus may further comprise determining means adapted to determine one of the bits of the group of input bits based on a connection.

The narrowband modulating means may be adapted to generate the sequence of symbols such that the sequence of symbols correspond to a sine wave with a single frequency offset over the carrier frequency.

According to a second aspect of the invention, there is provided an apparatus, comprising narrowband modulating circuitry configured to modulate a carrier signal based on a group of input bits comprising n input bits with n=1, 2, 3, . . . out of $2^n$ possible groups of input bits, such that, for each of the $2^n$ possible groups of input bits, a respective sequence of N symbols is generated, wherein N is predefined, each symbol has a same duration T, a bandwidth of the respective sequence of the N symbols is k/(N*T) with k being a real value and 0<k<N. k may be equal to 1.

There may be a broadband sequence of N symbols of the duration T on the carrier signal, wherein the bandwidth of the broadband sequence is 1/T.

The narrowband modulating circuitry may comprise selecting circuitry configured to select, based on the group of input bits, a set of ordered codewords out of a predefined group of sets of ordered codewords; and generic modulating circuitry configured to modulate the carrier signal with the set of ordered codewords as a payload in order to obtain the respective sequence of N symbols, wherein each of the codewords represents a predefined number b of bits with b=1, 2, 3, . . . ; each of the sets of ordered codewords comprises a predefined number of C codewords such that C*b=N>n; for each of the sets of ordered codewords of the group of sets of ordered codewords, a bandwidth of the respective sequence of symbols is k/(N*T).

The apparatus may further comprise inhibiting circuitry configured to inhibit the generic modulating circuitry from modulating the carrier signal with a broadband set of ordered codewords as the payload, wherein the broadband set of ordered codewords does not belong to the predefined group of sets of ordered codewords.

The generic modulating circuitry may be configured to modulate with a constant envelope. The generic modulating circuitry may be configured to modulate by Gaussian minimum shift keying. The generic modulating circuitry may be configured to modulate by 8-phase shift keying. The generic modulating circuitry may be configured to modulate according to a specification of the global system for mobile communication. The generic modulating circuitry may be configured to modulate according to OFDM system.

The apparatus may further comprise determining circuitry configured to determine one of the bits of the group of input bits based on a connection.

The narrowband modulating circuitry may be configured to generate the sequence of symbols such that the sequence of symbols correspond to a sine wave with a single frequency offset over the carrier frequency.

According to a third aspect of the invention, there is provided an apparatus, comprising separating means adapted to separate a segment of a predetermined period containing a sequence of symbols; and determining means adapted to determine, for the segment over the predetermined period, at least one of a frequency offset of a predetermined set of frequency offsets, a phase of a predetermined set of phases, and an amplitude of a predetermined set of amplitudes.

The apparatus may further comprise connection selecting means adapted to select a connection from which the signal is received based on one out of the frequency, the phase, and the amplitude.

According to a fourth aspect of the invention, there is provided an apparatus, comprising separating circuitry configured to separate a segment of a predetermined period containing a sequence of symbols; and determining circuitry configured to determine, for the segment over the predetermined period, at least one of a frequency offset of a predetermined set of frequency offsets, a phase of a predetermined set of phases, and an amplitude of a predetermined set of amplitudes.

The apparatus may further comprise connection selecting circuitry configured to select a connection from which the signal is received based on one out of the frequency, the phase, and the amplitude.

According to a fifth aspect of the invention, there is provided a method, comprising modulating a carrier signal based on a group of input bits comprising n input bits with n=1, 2, 3, . . . out of $2^n$ possible groups of input bits, such that, for each of the $2^n$ possible groups of input bits, a respective sequence of N symbols is generated, wherein N is predefined, each symbol has a same duration T, a bandwidth of the respective sequence of the N symbols is k/(N*T) with k being a real value and 0<k<N. k may be equal to 1.

There may be a broadband sequence of N symbols of the duration T on the carrier signal, wherein the bandwidth of the broadband sequence is 1/T.

The modulating may comprise selecting, based on the group of input bits, a set of ordered codewords out of a predefined group of sets of ordered codewords; and modulating the carrier signal with the set of ordered codewords as a payload in order to obtain the respective sequence of N symbols, wherein each of the codewords represents a predefined number b of bits with b=1, 2, 3, . . . ; each of the sets of ordered codewords comprises a predefined number of C codewords such that C*b=N>n; for each of the sets of ordered codewords of the group of sets of ordered codewords, a bandwidth of the respective sequence of symbols is k/(N*T).

The method may further comprise inhibiting an apparatus performing the method from modulating the carrier signal with a broadband set of ordered codewords as the payload, wherein the broadband set of ordered codewords does not belong to the predefined group of sets of ordered codewords.

The modulating may comprise modulating with a constant envelope. The modulating may comprise modulating by Gaussian minimum shift keying. The modulating may comprise modulating by 8-phase shift keying. The modulating may comprise modulating according to a specification of the global system for mobile communication. The modulating may comprise modulating according to OFDM system.

The method may further comprise determining one of the bits of the group of input bits based on a connection.

The modulating may comprise generating the sequence of symbols such that the sequence of symbols correspond to a sine wave with a single frequency offset over the carrier frequency.

According to a sixth aspect of the invention, there is provided method, comprising separating a segment of a predetermined period containing a sequence of symbols; and determining, for the segment over the predetermined period, at least one of a frequency offset of a predetermined set of frequency offsets, a phase of a predetermined set of phases, and an amplitude of a predetermined set of amplitudes.

The method may further comprise selecting a connection from which the signal is received based on one out of the frequency, the phase, and the amplitude.

According to a seventh aspect of the invention, there is provided a method, comprising configuring an apparatus according to any of claims 1 to 12; selecting the sequences of N symbols such that a bandwidth of the respective sequence of the N symbols is k/(N*T) with k being a real value and 0<k<N.

In the method, the apparatus may be an apparatus comprising the selecting means and the generic modulation means, and the method may comprise selecting the sets of ordered codewords of the group of sets of ordered codewords such that for each of the sets of ordered codewords of the group of sets of ordered codewords, a bandwidth of the respective sequence of symbols is k/(N*T).

Each of the methods of the fifth to seventh aspects may be a method of coverage optimization.

According to an eighth aspect of the invention, there is provided a computer program product comprising a set of instructions which, when executed on an apparatus, is configured to cause the apparatus to carry out the method according to any one of the fifth to seventh aspects. The computer program product may be embodied as a computer-readable medium or directly loadable into a computer.

According to some embodiments of the invention, at least one of the following advantages may be achieved:
  extended coverage in particular for low data rates;
  upgrade of existing GSM/EDGE systems (base stations) without HW impact;
  backward compatibility: legacy terminals and terminals according to embodiments of the invention may be multiplexed;
  efficient support of a high number of terminals;
  efficient usage of bandwidth;
  high transmitter power efficiency with constant envelope modulation providing low battery power consumption of the terminals
  technique may be suitable also for OFDM based systems, where concatenation of several symbols may allow introduction of fractional transmission bandwidths e.g. 15 kHz/N (N>1, integer) for improved coverage.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein FIGS. 1a) to d) show some options for a transmitting apparatus according to embodiments of the invention;

FIG. 2 shows example of properties achieved with some modulations according to some embodiments of the invention;

FIG. 3a) shows an exemplary rule to determine symbols based on a set of ordered codewords and 3b and 3c) show examples of sequences of GMSK symbols according to some embodiments of the invention;

FIG. 4a) shows an exemplary rule to determine symbols based on a set of ordered codewords, 4b) shows an explanation of the codewords in terms of phase indexes, and 4c) shows an example of sequences of 8PSK symbols according to some embodiments of the invention;

FIGS. 6a) to c) show a transmitter, a receiver, and a detail of a NB demodulation unit according to some embodiments of the invention;

FIG. 7 shows an apparatus according to an embodiment of the invention;

FIG. 8 shows a method according to an embodiment of the invention;

FIG. 9 shows an apparatus according to an embodiment of the invention;

FIG. 10 shows a method according to an embodiment of the invention; and

FIG. 11 shows an apparatus according to an embodiment of the invention.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details. Moreover, it is to be understood that the apparatus is configured to perform the corresponding method, although in some cases only the apparatus or only the method are described.

According to some embodiments of the invention, an incoming data stream (input bits) is grouped into groups of input bits of the same length. These groups are manipulated and modulated such that for each possible group of input bits, a sequence of (RF) symbols is emitted wherein the bandwidth of the sequence is equal to the inverse of the length of the sequence of symbols. Each of the symbols has a same length (duration).

According to some embodiments of the invention, existing modulators, e.g. GMSK, are exploited by a pre-coding such that they produce a signal with a fractional bandwidth of the symbol rate. That signal may carry information on frequency offset and signal phase as FSK or MSK/BPSK, respectively.

Figure 1A:
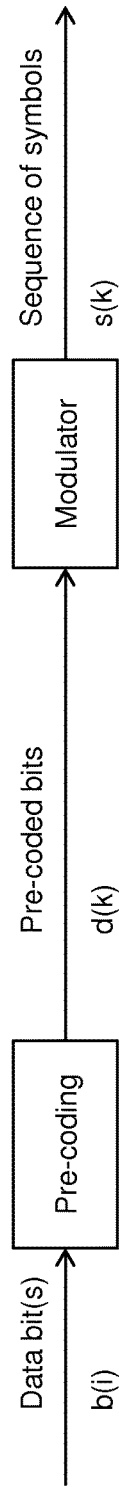
Figure 1B:
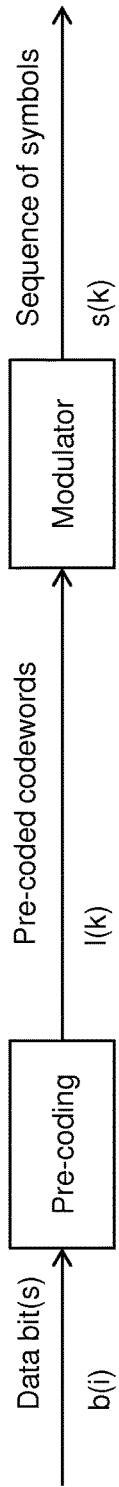

In detail, according to some embodiments of the invention as shown in FIGS. 1*a*) to *c*), input bits (e.g. channel encoded bits) may pass through a pre-coder to a modulator, where the pre-coded bits (FIG. 1*a*), or codewords (FIG. 1*b*) from the pre-coder are modulated.

A codeword may represent one or more bits. For example, as shown in FIGS. 3*b*) and 3*c*), the pre-coder generates ordered pre-coded bits based on each group of input bits, wherein the sequence of pre-coded bits comprises more bits than the group of input bits. In this case, each bit of the sequence of pre-coded bits may be also named a codeword, and the sequence of pre-coded bits may be named a set of ordered codewords.

As shown in FIG. 4*c*, the pre-coder may generate a set of ordered codewords, wherein each codeword has a value range e.g. between 0 and 7. Each of these codewords represents three bits (e.g. $4_{dec}=100_{bin}$), such that each set of ordered codewords of FIG. 4*c* represent 24 bits in total. Thus, on the physical layer, each set of ordered codewords may be represented by a sequence of 24 bits.

Alternatively, each of the codewords may represent a phase in the complex plane, as shown in FIG. 4*b*) as an example. Thus, each codeword may be represented by a combination of a Q-signal and an I-signal. The phase of the I signal may be calculated relative to the digital clock, and the phase of the Q-signal is calculated relative to the digital clock with a phase lag of 90° (n/2). E.g., the codeword 0 may be represented by a pulse having no phase shift relative to the digital clock (e.g. being synchronous with a leading edge of the digital clock if the leading edge represents the beginning of a cycle of the digital clock), and the codeword 1 may be represented by a pulse having a phase shift of 45° (n/4) relative to the digital clock. The association of codewords to phase shifts may be different from that shown in FIG. 4*b*), e.g. by one or more permutations. Depending on the number of bits to be represented, there may be other phase shifts than multiple of 45° (n/4) shown in FIG. 4*b*.

The table in FIG. 4*b*) shows one of several options to associate phase indexes and bits representing codewords. E.g., according to this table, a codeword "7" may be represented as 1,1,1 in bits, or it may be represented as a phase index such as 0. Some embodiments of the invention may use other associations of bits to phase indices.

Other options to represent the codewords (i.e. digital signals) on the physical layer are feasible, too, if they are suitable as input to the modulator.

In some embodiments of the invention, the input bits are grouped into groups of a predetermined length (e.g. 1 input bit, or 2 input bits, or 3 input bits, etc.). Accordingly, there are $2^N$ possible groups of input bits, where N is the predetermined number of input bits in each group (i.e. the length of each group). Also, each of the sets of ordered codewords (bits) has a predefined length, e.g. 8 bits or 8 codewords, for all possible groups of input bits. Each codeword represents a number of bits depending on the underlying modulation e.g. GMSK or 8PSK. The number of bits represented by the set of ordered codewords is larger than the number of bits of each group of input bits. In the example of FIG. 4*c*, each of the sets of ordered codewords represents 24 bits, while each group of input bits consists of 3 bits only. That is, the number of bits represented by each set of ordered codewords is a multiple (here: 8 times) of the number of input bits in a group of input bits.

Figure 1C:
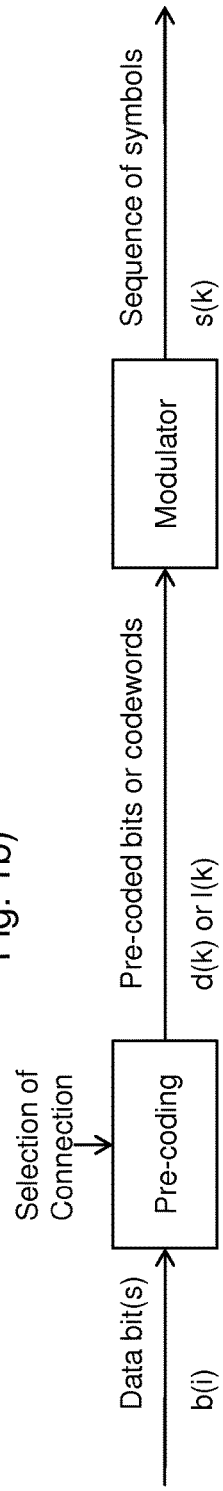

FIG. 1*c*) shows a case, where the pre-coding takes into account a selection of connection in addition of the input bits. Further details of this embodiment are described further below related to FIG. 5.

The pre-coder assigns a certain set of ordered codewords to each group of input bits inputted into the pre-coder. The set of ordered codewords is selected out of a group of sets of ordered codewords. For each of the sets of ordered codewords of the group a sequence of symbols generated by the modulation of the modulator has a bandwidth equal to an inverse of a duration of the sequence of symbols. Note that, in the context of the present application, the term "symbol" refers to the output of the modulator, i.e. where the digital input into the modulator is keyed to e.g. the phase of the carrier frequency (e.g. RF frequency).

Compared to a conventional case, such a spectrum is very narrow. Conventionally, if arbitrary codewords are input into the modulator, the modulator will modulate them such that the obtained sequence of symbols has a bandwidth up to an inverse of a duration of each symbol. In contrast to that, according to embodiments of the invention, such a narrow spectrum is achieved, because the sequence of symbols is a discrete cycle or several cycles of sine. Accordingly, the allowed space of sequences of symbols and, correspondingly, the allowed space of sets of ordered codewords is limited.

A number of cycles of the sequence of symbols output from the modulator defines relative frequency offset and a direction of a rotation in complex domain defines the polarity. That sine tone may have phase offset i.e. it may carry phase modulation e.g. MSK or BPSK. Furthermore, e.g. QAM is possible with tone specific amplitude and phase. A set of produced frequencies can be used to carry bits like with FSK or mFSK type of modulations or combined with MSK or BPSK as a hybrid modulation. With hybrid modulation the maximum number of bits carried is cumulated.

According to some embodiments of the invention, some sequences of symbols produce a constant (i.e. zero) frequency offset, which has equally narrow bandwidth. However, that is preferably left unused e.g. in many OFDM systems due to avoiding possible issues with e.g. leakage of local oscillator.

The sequence of symbols with narrow transmission bandwidth (also named NB sequence) may comprise 2 or more different phase shifts, and/or it may comprise 2 or more different amplitudes. Thus, the tone may represent more than one bit with increased degree of modulation. Indeed the frequency offset of sequence of symbols may represent one or more bits, depending on the smallest phase difference in between successive symbols. E.g. with 90 or 45 degrees smallest phase difference, 1 or 2 bits may be carried, respectively.

The respective number of different frequency shifts, phase shifts, and amplitudes is not limited to 2. They may be selected such that the predefined number of input bits may be represented.

It is to be noted that the modulator would generate a signal with a broader transmission bandwidth if other codewords than those, based on which the NB sequence is generated, would be fed into the modulator. In general, an arbitrary sequence of symbols has a bandwidth equal to the inverse of the duration of each symbol instead of an inverse of the duration of the sequence of symbols. That is, according to embodiments of the invention, the modulator, which may be considered as configured for narrow band, outputs only such sequences of symbols out of all possible sequences of symbols with the same number of symbols per sequence where the bandwidth is less than the inverse of the duration of each symbol.

If T is the duration of each symbol (each symbol has the same duration), and N is the number of symbols in each sequence (N≥2, integer), then, in some embodiments, the bandwidth of the sequence of symbols output by the modulator is 1/NT instead of 1/T for an arbitrary sequence of N symbols of duration T.

In some embodiments of the invention, the reduction of bandwidth is less pronounced. For example, in these embodiments the bandwidth of each sequence of N symbols output by the modulator may be k/(N*T) with k real, k<N. The bandwidth may be the same for all sequences of symbols output by the modulator, or different sequences may have different bandwidths, wherein each of the bandwidths may be described by $k_i$/NT ($k_i$ real, $k_i$<N, i being an index representing the respective sequence).

An underlying modulation scheme that offers symbols for a narrowband sequence, should preferably be keyed at least with finite number of phases to enable determining sequence with narrow bandwidth, inverse of duration of sequence of symbols.

In the following, some embodiments of the invention are described at greater detail:

Conventionally, the data flow from the channel encoder is included into a burst as payload, wherein the burst comprises in addition e.g. a training sequence, tail symbols etc. The burst is then modulated.

According to embodiments of the invention, the data flow from the channel encoder passes first through the pre-coder, and the burst (named HM burst) is build using the set of ordered codewords from the pre-coder as payload. Then, the burst is modulated to obtain a sequence of symbols.

In some embodiments of the invention, the conventional burst structure is slightly modified to enable carrying multiple of narrow band sequences. Table 1 shows an example, wherein the periods are indicated in symbol periods, i.e. bits for GSMK. Other burst structures, e.g., consisting only of narrow band signal, are possible. The spare symbols and stealing flags may be used e.g. for RLC or MAC related signalling for ensuring high utilization of symbols in burst.

TABLE 1

Comparison of conventional burst and a HM burst according to some embodiments of the invention

| | Burst Period Amount of symbol periods | |
|---|---|---|
| | Conventionally | HM burst |
| Tail symbols | 3 | 3 |
| Payload symbols | 57 | 56 (7 sets of ordered codewords) |
| Spare | — | 1 |
| Stealing Flag | 1 | 1 |
| Training Sequence | 26 | 26 |
| Stealing Flag | 1 | 1 |
| Spare | — | 1 |
| Payload symbols | 57 | 56 (7 sets of ordered codewords) |
| Tail symbols | 3 | 3 |
| Guard period | 8.25 | 8.25 |

FIG. 2 shows properties for some possible modulation parameters for GMSK and 8PSK based modulators and for LTE OFDM, which also may be used according to embodiments of the invention. Tables illustrate bandwidths, number of frequency offsets, examples of sub carrier modulation and obtainable number of carried bits depending on selected schemes.

As may be seen from FIG. 2, the bandwidth of the sequence of symbols is only a fraction (in the examples shown in FIG. 2: ⅛ or ¼) of the inverse of the duration of each symbol. The number of possible input bits (m) with FSK is obtained from the number of possible frequency offsets (fo) such that $2^m$<fo. The number of possible input bits with MSK is one because the polarity of the sequence in complex space (rotation direction) may be +1 or −1. The last row indicating the number of possible input bits with both FSK and MSK/BPSK indicates the sum of the two previous rows.

In some embodiments of the invention, GMSK may be used as a modulation method, which is typically used in GSM. However, due to the set of ordered codewords provided by the pre-coder, the GMSK modulator operates in fact, depending on the inputted set of ordered codewords like a hybrid GMSK+NB FSK, NB MSK modulator, hybrid GMSK+NB MSK, hybrid GMSK+NB FSK+NB MSK, NB FSK and NB MSK modulator or a subset of these combinations.

FIG. 3a) defines a GMSK modulation function s(k) for k ordered pre-coded bits $d_k$, where k=[0, 1, ..., 7] according to some embodiments of the invention.

FIGS. 3b and 3c show a mapping, i.e. pre-coding, of input bits (FIG. 3c) or groups of input bits (FIG. 3b) to sets of ordered codewords (in this case: sets of ordered bits) and NB sequences of symbols and properties of the resulted output from the modulator according to some embodiments of the invention.

According to FIG. 3b), the incoming bits of data stream are pre-coded in groups of 2 bits to combine FSK and MSK; whereas, according to FIG. 3b), only one bit is used with MSK modulated tone. In the second column, a bit sequence (set of ordered codewords) is derived so that when it is fed into GMSK modulator. The resulted sequence of symbols has properties described in the four rightmost columns. Column "Complex values" represent actual symbols of a sequence of symbols. Column named as "shifted FFT" demonstrates the signal in frequency domain. In this case, shifted FFT output provides values for frequency bins of [−4/(8T), −3/(8T), −2/(8T), −1/(8T),0), 1/(8T),), 2/(8T), 3/(8T)], i.e. [−135, −102, −68, −34, 0, 34, 68, 102] kHz for T=3.68 µs, as e.g. in GSM. ⅛ of bandwidth, frequency offset, as well as the phase information are clearly visible in frequency domain representation. Phase (i.e. initial phase of the sequence of symbols) and frequency offset are summarized in two rightmost columns.

For each group of input bits, a set of 8 ordered codewords, i.e. bits in case of GMSK are generated by the pre-coder. Out of the $2^8$ possible sets with 8 ordered bits, only 4 (i.e. 00000000, 11111111, 01010101, and 10101010) are used by the pre-coder. Hence, the modulator has to modulate only these 4 ordered sets of bits thereof (e.g. as payload of a burst such as a HM burst). 4 possible ordered sets of bits mean similar receiver complexity as with QPSK per NB symbol. Furthermore, receiver complexity may be reduced compared to GMSK when NB symbol rate is just ⅛ of normal symbol rate.

In some embodiments of the invention, the association of ordered pre-coded bits to input bits may be different from that shown in FIGS. 3b) and c), e.g. by one or more permutations.

Since the GMSK modulator does not receive (as payload) any other bit sequences than the 4 ordered pre-coded sequences of bits shown in the second column of FIG. 3b), it generates in fact a sinusoidal output signal, with two different phases at a time (+1 and −1 meaning 0 and n radian, as shown in the fifth column of FIGS. 3b) and c) and two different frequency shifts over its carrier frequency (+68 kHz and −68 kHz, as shown in the rightmost column of FIGS. 3b) and c)). Thus, a receiver, e.g. in a base station, may detect the signal by e.g. band-pass filtering the +/−68 kHz tones with BW of 34 kHz, that BW is ⅛ *13 MHz/48.

The bandwidth of the signal may be adjusted with the length of a sequence of symbols. E.g. 8 and 4 symbols provide transmission bandwidth of 34 kHz and 68 kHz, respectively.

With 8PSK, similar phase shifts and even more frequency shifts can be provided by sets of ordered codewords as depicted in FIG. 4c. More frequency shifts are introduced by smaller phase increment of 45 degrees in modulator compared to GMSK with 90 degrees increment. In that embodiment of the invention, groups of 3 input bits are mapped to 8 different sets of ordered codewords which are modulated to 8 different sequences of symbols (also named NB sequences because of their narrow bandwidth).

Column 2 shows sets of ordered codewords, wherein each codeword is denoted as a phase index $l_k$. That is, each of the codewords may be considered as a phase, as shown in FIG. 4b) (according to [2], section 3.2). Accordingly, on the physical layer, each codeword may be represented as Q signal or I signal relative to the clock of the digital part.

FIG. 4a) describes the 8PSK modulation function s(k) for a set of k ordered codewords $l_k$, where k=[0, 1, . . . , 7]. In this case, the modulator performs n/2 rotation of symbols (see formula in FIG. 4a), in addition to modulating the carrier frequency (e.g. RF frequency) by the pre-coded codewords as a baseband signal.

The last four columns of FIG. 4c show different representations of the sequence of output signals from the modulator. In the third column, the sequence of output symbols is given as a sequence of phases. I.e., the phase of each of the output symbols in a sequence is indicated. Column named as shifted FFT, demonstrates the signal in frequency domain, where ⅛ of bandwidth, 5 possible frequency offsets (including zero frequency offset, which may be used to transmit input bits, or, as according to some embodiments of the invention, for adding number of connections by multiplexing), as well as the phase information are clearly visible and summarized in two rightmost columns. Shifted FFT column also shows that FFT may be used in demodulating side according to some embodiments of the invention.

The pre-coding could produce other outputs than phase index as sets of ordered codewords. E.g. it may provide a set of ordered codewords where, if the codewords are represented as phases in the complex plane according to e.g. FIG. 4b), the codewords of the set of ordered codewords include symbol rotation such that the modulator does not have to rotate the symbols. The pre-coder may generate the set of ordered codewords based on a formula or based on a lookup table. The mapping could be optimised by using common criteria, e.g. gray mapping, where Euclidean distance for each payload bit is maximised. Alternatively pre-coding may produce 8×3 bits sequence or identifiers for 8 symbols for 8PSK modulator instead of sequence of 8 codeword values based on input bits or other information.

In table 4c) bit $b_{3i}$ defines the phase of NB sequences (−1 or +1) and two bits $b_{3i+1}$ and $b_{3i+2}$ define the frequency shift. Note that in example with symbol rotation of n/2, the center frequency may be left unused.

In some embodiments of the invention, only one input bit with BPSK is transmitted and frequency shift is used as a predetermined sub-carrier for a symbol. With n/2 symbol rotation it is possible to produce 5 of such subcarriers.

Symbol rotation by n/2 is one of several options for symbol rotation. For example, if symbol rotation of 3n/8 is selected, then a set of frequency offsets provided by sequences of symbols includes [−3, −1, 1, 3]/(16T) i.e. [−51, −17, 17, 51] kHz. In this case zero frequency offset is not provided, when −n/8 rotation, compared to previous n/2 rotation case, acts like a half sub carrier shifting function in OFDM based systems.

Figure 1D:

In some embodiments of the invention, as shown in FIG. 1d), the pre-coder and the modulator are summarized in a single entity, which is named NB modulator. In these embodiments, the set of ordered codewords may not be generated at all but the sequence of symbols with narrow bandwidth is directly generated from the input bits. I.e. the modulator generates, for all possible groups of input bits (depending on the length of each group, e.g. for the sixteen possible groups of input bits if each group comprises four bits), sequences of symbols with a bandwidth which is an inverse of the duration of the sequence symbols (or, more generally, not more than k/(N*T) with N: number of symbols in the sequence; T: duration of each symbol; k: real, 0<k<N).

In contrast to the NB modulator of FIG. 1d), each of the modulators of FIGS. 1a) to 1c) may sometimes be named generic modulator.

Figure 5:
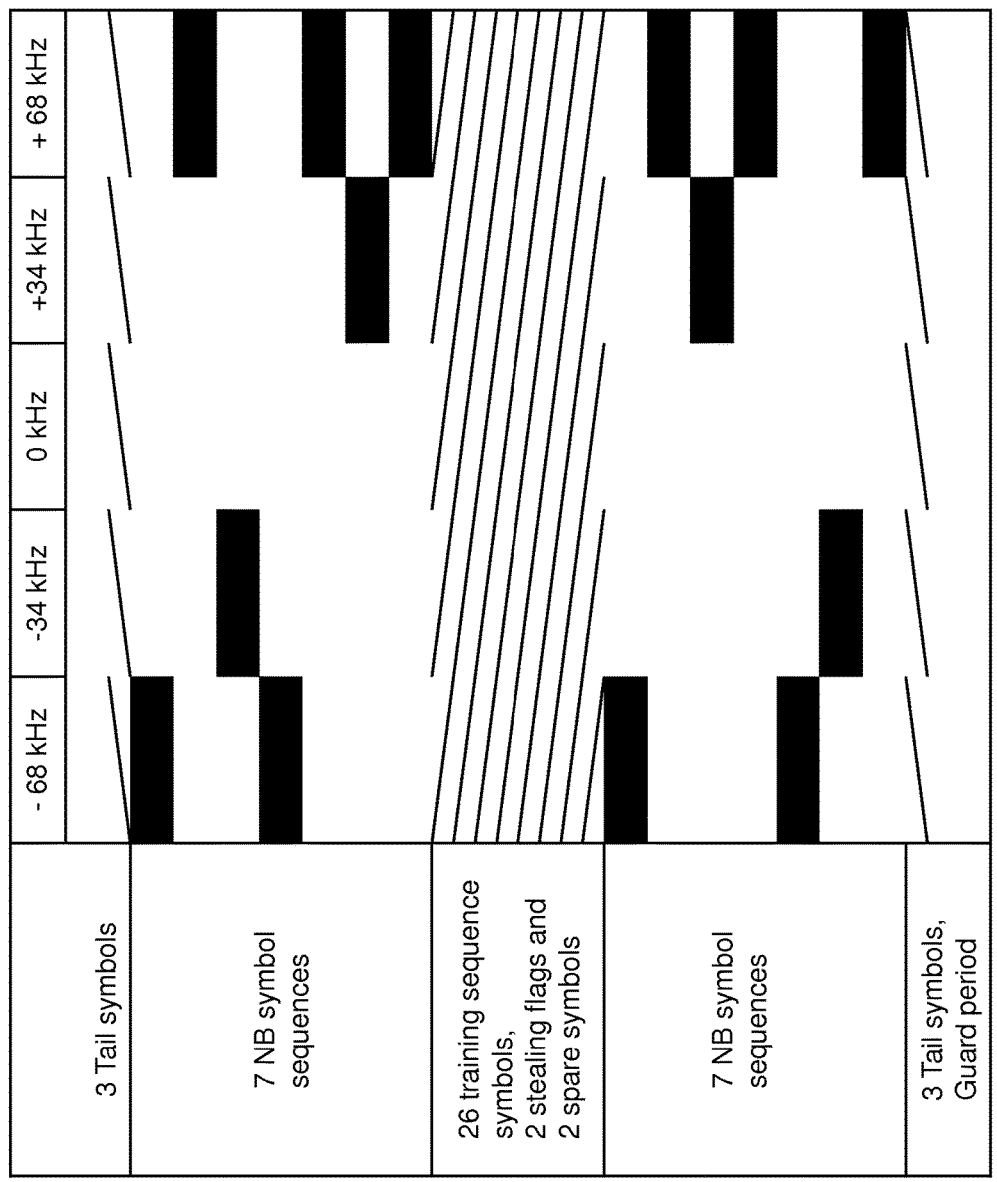
FIG. 5 illustrates an example of a spectrogram for a burst format according to some embodiments of the invention.

FIG. 5 illustrates an example of a spectrogram for a burst format according to some embodiments of the invention. Therein, 7 symbols generated by modulating sets of ordered codewords are located at each of both sides of the training sequence, respectively. The diagram does not illustrate phase of MSK, but only use of FSK.

According to some embodiments of the invention, several connections are multiplexed with assigned frequency offsets for a NB sequence. Multiplexing may also exploit orthogonal sub-channels or multiuser MIMO techniques although sensitivity may be compromised. An example embodiment of the invention is shown in FIG. 1c).

In an embodiment of the invention, based on the mapping table of FIG. 3b), a first user may have "0" assigned as $b_{2i+1}$ of his data stream (input bits), and a second user may have "1" assigned as $b_{2i+1}$ his data stream. Then, the second bit of each segment of the data stream of the first user is "0" such that the modulator of this user transmits only +67 kHz tone, while the second bit of each segment of the data stream of the second user is "1" such that the modulator of this user transmits only −67 kHz tone. Thus, also the receiver, e.g. base station or mobile station, may distinguish the two users based on their tones.

FIG. 6a shows a transmitter (e.g. GSM transmitter) and FIG. 6b) shows a receiver (e.g. GSM receiver) according to some embodiments of the invention.

In the transmitter, a channel encoder first encodes a data stream. The data stream is then input into the pre-coding block. The pre-coding block, together with the GMSK modulation block, corresponds to an embodiment of the invention. I.e., it outputs only selected sets of ordered codewords (e.g. bit sequences) such that the modulator generates a signal (sequence of symbols) with narrow transmission bandwidth as described hereinabove.

The sets of ordered codewords generated by the pre-coding block are inserted into a burst in the burst building block, wherein a burst comprises in addition e.g. TSC, SF, and tails. In the burst building block, the different components including the symbols from the pre-coding block are concatenated. The burst building block is optional.

The burst (or, if there is no burst building block: the sets of ordered codewords from the pre-coder) are input into the modulator, which may be a GMSK modulator according to GSM standard and are modulated by the carrier signal (e.g. RF signal).

The channel encoder, burst building block, and modulator may correspond to conventional GSM standards. In some embodiments, the output of the channel encoder is forwarded to the burst building block via DSP. In these embodiments, the pre-coding block may be software running in the DSP. Thus, existing transmitters may be upgraded to transmitters according to embodiments of the invention by software upgrade without HW impact.

In some embodiments of the invention, the filters on the receiver side may be narrower than corresponding filters which may be used if arbitrary symbols are to be demodulated and decoded (such as the filters normally used according to GSM standards).

In the receiver side, A/D conversion, symbol de-rotation (not shown), and equalization may be as according to conventional GSM receivers. In particular, these components do not need to be modified if modulation parameters or e.g. training sequence are kept the same as according to GSM standards.

The de-mapping unit ("Period separation unit" 62) separates periods of symbol sequences from the payload for further processing. E.g., if the HM burst scheme according to Table 1 is used, each of the payloads before and after the TSC are split into 7 periods of symbol sequences.

The NB Demodulation 61 may include frequency shift separation and selection or detection e.g., based on Discrete Fourier Transformation (DFT) e.g. by a FFT processor and a BPSK receiver, where each of the sequences of symbols (i.e. the split parts) is Fourier transformed. Such a NB demodulator is shown in FIG. 6c). I.e., in some embodiments of the invention, the NB Demodulation 61 detects a frequency shift out of a predefined set of frequency shifts and outputs a bit pattern corresponding to the frequency shift. In the example of FIG. 4c, if a frequency offset of +68 kHz is detected, the NB Demodulation outputs 1,1 as $b_{3i+1}$ and $b_{3i+2}$, and if a frequency offset of +34 kHz is detected, the NB Demodulation outputs 0,1 as $b_{3i+1}$ and $b_{3i+2}$, etc. The predefined set of frequency shifts in the case of FIG. 4c consists of +68 kHz, +34 kHz, −34 kHz, and −68 kHz. Correspondingly, in some embodiments of the invention, the NB Demodulation 61 detects a phase out of a predefined set of phases and outputs a bit pattern corresponding to the phase. In the example of FIG. 4c, if a phase (here: sense of rotation) of −1 is detected, the NB Demodulation outputs 0 as $b_{3i}$, and if a phase (here: sense of rotation) of 1 is detected, the NB Demodulation outputs 1 as $b_{3i}$. Correspondingly, in some embodiments of the invention, the NB Demodulation 61 detects an amplitude out of a predefined set of amplitudes and outputs a bit pattern corresponding to the amplitude. According to some embodiments of the invention, only one of frequency shift, phase, and amplitude are detected, whereas according to other embodiments, two or three of frequency shift, phase, and amplitude are detected. If plural of these properties are detected, detection may be performed in parallel or in an arbitrary sequence.

In some embodiments of the invention, other transformations such as a Fourier transformation may be used to transform the split parts from the time domain into the frequency domain for detecting a narrow band signal with a fraction of bandwidth. The NB detection unit may also be just a bit or symbol pattern detector for sequences of each possible narrow band symbols, but possibly with some compromises on mitigating interference, especially narrow band interference or with limitations on multiplexing several connections. If receiver employs oversampling, then FFT size may increase accordingly. The symbol sequence detector is actually a time domain equivalent of FFT based frequency domain detector (i.e. modulated symbols vs. shifted FFT columns in FIGS. 3b, 3c and 4c).

Table 2 illustrates example of counter parts in TX and RX side:

TABLE 2

Counter parts in TX and RX side

| Transmitter | Receiver |
|---|---|
| Transmitting a symbol sequence with a length of N symbols with narrow bandwidth. | Separating period of sequence of N symbols from received signal. |
| Selecting frequency offset for symbol sequence. | Selecting/Detecting frequency with maximum energy from output of FFT (N). |
| Selecting phase information in symbol sequence. | Detecting phase information from selected output bin of FFT. |
| Grouping for input bits. | De-grouping for detected bits. |

Channel decoding in the channel decoding block may correspond to GSM standards.

Correspondingly as described for the transmitting side, the blocks of de-mapping block ("Period separation" 62) and NB Detection block ("NB demodulation" 61) may be implemented as software in a DSP such that embodiments of the invention may be implemented in existing receivers by SW upgrade without HW impact.

FIG. 7 shows an apparatus according to an embodiment of the invention. The apparatus may be a transmitter such as a transmitter of a user equipment or a base station, or an element thereof. FIG. 8 shows a method according to an embodiment of the invention. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises narrowband modulating means 10.

The narrowband modulating means 10 modulates a carrier signal based on a group of input bits comprising n input bits with n=1, 2, 3, . . . out of $2^n$ possible groups of input bits (S10). In detail, the narrowband modulating means 10 modulates such that, for each of the $2^n$ possible groups of input bits, a respective sequence of N symbols with a narrow bandwidth is generated. N is predefined and may be larger than n (i.e. the number of input bits per group). Each symbol has a same duration T. The narrow bandwidth of the respective sequence of the N symbols is k/(N*T), where k is a real multiplier, 0<k<N, preferably 1≤k<N. Preferably, k is integer with a value range k=1, 2, . . . , N−1, and more preferably, k=1.0.

Note that arbitrary sequences of N symbols of duration T have a bandwidth of 1/T which is more than k/(N*T). An example of a sequence of symbols with k=2 is where the shifted FFT in FIG. 4c) is (0, 0, 0, 0, −4, −4, 0, 0), such that the signal power is split over two frequency offsets. Pulse shaping filters may further reduce the bandwidth, but may also generate ISI.

In some embodiments such as those shown in FIGS. 1a) to 1c), the NB modulating means 10 comprises selecting means and generic modulating means.

The selecting means selects, based on the group of input bits, a set of ordered codewords out of a predefined group of sets of ordered codewords. The selecting means may be a pre-coder. Each of the codewords represents a predefined number b of bits with b=1, 2, 3, . . . . Each of the sets of ordered codewords comprises a predefined number of C codewords such that C*b=N>n.

The generic modulating means modulate the carrier signal with the set of ordered codewords as a payload in order to obtain the respective sequence of N symbols. For each of the sets of ordered codewords of the group of sets of ordered codewords, a bandwidth of the respective sequence of symbols generated by the generic modulating means is k/(N*T).

An inhibiting means may take care that other sets of ordered codewords than those of the predefined group are not input into the modulator as the payload.

FIG. 9 shows an apparatus according to an embodiment of the invention. The apparatus may be a receiver such as a receiver of a user equipment or a base station, or an element thereof. FIG. 10 shows a method according to an embodiment of the invention. The apparatus according to FIG. 9 may perform the method of FIG. 10 but is not limited to this method. The method of FIG. 10 may be performed by the apparatus of FIG. 9 but is not limited to being performed by this apparatus.

The apparatus comprises separating means 110 and determining means 120.

The separating means 110 separates a segment of a predetermined period containing a sequence of symbols (S110).

The determining means 120 determines for the segment at least one of a frequency offset of a predetermined set of frequency offsets, a phase of a predetermined set of phases, and an amplitude of a predetermined set of amplitudes over the predetermined period (S120).

FIG. 11 shows an apparatus according to an embodiment of the invention. The apparatus comprises at least one processor 210, at least one memory 220 including computer program code, and the at least one processor, with the at least one memory and the computer program code, being arranged to cause the apparatus to at least perform at least one of the methods according to FIGS. 8 and 10.

Embodiments of the invention may be employed in a GSM network. They may be employed also in other mobile networks such as CDMA, EDGE, LTE, LTE-A, UTRAN, WiFi networks, etc.

Embodiments of the invention are not limited to GMSK, 8PSK, QPSK or 4FSK but may employ other modulations including higher order modulations. However, in some cases, the latter might not be too attractive due to coverage and complexity objectives.

Embodiments of the invention may be deployed in one or both of an uplink and a downlink.

A terminal may be a user equipment such as a mobile phone, a smart phone, a PDA, a laptop, a tablet PC, or any other device such as an MTC, M2M, or an IoT device which may be connected to the respective mobile network.

The sets of ordered codewords (bits) output from the pre-coder may have 8 codewords (bits) as described. However, in the context of the present application, for different implementations, the set of ordered codewords (bits) may have any number of codewords (bits), preferably a number which may be represented as $2^q$ with q=1, 2, 3, . . . .

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. It does not necessarily mean that they are based on different firmware. That is, each of the entities described in the present description may be based on a different firmware, or some or all of the entities may be based on the same firmware.

According to the above description, it should thus be apparent that exemplary embodiments of the present invention provide, for example a transmitting device such as a terminal, e.g. a user equipment, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that exemplary embodiments of the present invention provide, for example a receiving device such as a base station or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:
1. An apparatus, comprising
at least one processor; and
at least one memory including computer program code,
wherein the at least one memory and computer program code are configured to, with the at least one processor, cause the apparatus at least to:
modulate a carrier signal based on a group of input bits comprising n input bits with n=1, 2, 3, . . . out of $2^n$ possible groups of input bits, such that, for each of the $2^n$ possible groups of input bits, a respective sequence of N symbols is generated, wherein N is an integer greater than 1, each symbol has a same duration T, a bandwidth of the respective sequence of the N symbols is k/(N*T) with k being a real value and 0<k<N.
2. The apparatus according to claim 1, wherein there is a broadband sequence of N symbols of the duration T modulated on the carrier signal, wherein the bandwidth of the broadband sequence is 1/T.

3. The apparatus according to claim 1 the at least one memory and computer program code are further configured to, with the at least one processor, cause the apparatus at least to:
  select, based on the group of input bits, a set of ordered codewords out of a predefined group of sets of ordered codewords; and
  modulate the carrier signal with the set of ordered codewords as a payload in order to obtain the respective sequence of N symbols, wherein
  each of the codewords represents a predefined number b of bits with b=1, 2, 3, . . . ;
  each of the sets of ordered codewords comprises a predefined number of C codewords such that C*b=N>n; and
  for each of the sets of ordered codewords of the group of sets of ordered codewords, a bandwidth of the respective sequence of symbols is k/(N*T).

4. The apparatus according to claim 3, wherein the at least one memory and computer program code are further configured to, with the at least one processor, cause the apparatus at least to:
  inhibit modulating the carrier signal with a broadband set of ordered codewords as the payload, wherein the broadband set of ordered codewords does not belong to the predefined group of sets of ordered codewords.

5. The apparatus according to claim 3, wherein the modulating the carrier signal with the set of ordered codewords comprises modulating with at least one of a constant envelope modulation, a Gaussian minimum shift keying, a 8-phase shift keying, a modulation according to a specification of the global system for mobile communication and an OFDM modulation.

6. The apparatus according to claim 3, wherein the at least one memory and computer program code are further configured to, with the at least one processor, cause the apparatus at least to:
  select the sets of ordered codewords of the group of sets of ordered codewords such that for each of the sets of ordered codewords of the group of sets of ordered codewords, a bandwidth of the respective sequence of symbols is k/(N*T).

7. The apparatus according to claim 1, wherein the at least one memory and computer program code are further configured to, with the at least one processor, cause the apparatus at least to:
  determine one of the bits of the group of input bits based on a connection.

8. The apparatus according to claim 1 wherein the at least one memory and computer program code are further configured to, with the at least one processor, cause the apparatus at least to:
  generate the sequence of symbols such that the sequence of symbols correspond to a sine wave with a single frequency offset over the carrier frequency.

9. The apparatus according to claim 1, wherein k=1.

10. The apparatus according to claim 1, wherein the at least one memory and computer program code are further configured to, with the at least one processor, cause the apparatus at least to:
  select the sequences of N symbols such that a bandwidth of the respective sequence of the N symbols is k/(N*T) with k being a real value and 0<k<N.

11. A method, comprising modulating a carrier signal based on a group of input bits comprising n input bits with n=1, 2, 3, . . . out of $2^n$ possible groups of input bits, such that, for each of the $2^n$ possible groups of input bits, a respective sequence of N symbols is generated, wherein N is an integer greater than 1, each symbol has a same duration T, a bandwidth of the respective sequence of the N symbols is k/(N*T) with k being a real value and 0<k<N.

12. The method according to claim 11, wherein there is a broadband sequence of N symbols of the duration T modulated on the carrier signal, wherein the bandwidth of the broadband sequence is 1/T.

13. The method according to claim 11, wherein the modulating comprises
  selecting, based on the group of input bits, a set of ordered codewords out of a predefined group of sets of ordered codewords; and
  modulating the carrier signal with the set of ordered codewords as a payload in order to obtain the respective sequence of N symbols, wherein
  each of the codewords represents a predefined number b of bits with b=1, 2, 3, . . . ;
  each of the sets of ordered codewords comprises a predefined number of C codewords such that C*b=N>n;
  for each of the sets of ordered codewords of the group of sets of ordered codewords, a bandwidth of the respective sequence of symbols is k/(N*T).

14. The method according to claim 13, further comprising
  inhibiting an apparatus performing the method from modulating the carrier signal with a broadband set of ordered codewords as the payload, wherein the broadband set of ordered codewords does not belong to the predefined group of sets of ordered codewords.

15. The method according to claim 13, wherein the modulating the carrier signal with the set of ordered codewords comprises modulating with at least one of a constant envelope modulation, a Gaussian minimum shift keying, a 8-phase shift keying, a modulation according to a specification of the global system for mobile communication and an OFDM modulation.

16. The method according to claim 11, further comprising determining one of the bits of the group of input bits based on a connection.

17. The method according to claim 11, wherein the modulating comprises generating the sequence of symbols such that the sequence of symbols correspond to a sine wave with a single frequency offset over the carrier frequency.

18. The method according to claim 11, wherein k=1.

* * * * *